United States Patent [19]

Li et al.

[11] Patent Number: 4,677,164

[45] Date of Patent: Jun. 30, 1987

[54] CHLORINATED POLY(VINYL CHLORIDE) COMPOSITIONS

[75] Inventors: George S. Li, Solon; Muyen M. Wu, Hudson; Elmer J. DeWitt, Cuyahoga Falls, all of Ohio

[73] Assignee: The Standard Oil Company, Cleveland, Ohio

[21] Appl. No.: 859,519

[22] Filed: May 5, 1986

[51] Int. Cl.⁴ .............................................. C08F 32/08
[52] U.S. Cl. ................................................... 525/210
[58] Field of Search ......................... 525/210; 526/280

[56] References Cited

U.S. PATENT DOCUMENTS

| 4,074,038 | 2/1978 | Li | 526/280 |
| 4,117,040 | 9/1978 | Li | 525/210 |
| 4,153,648 | 5/1979 | Li | 525/210 |

*Primary Examiner*—Paul R. Michl
*Attorney, Agent, or Firm*—Charles S. Lynch; John E. Miller; Larry W. Evans

[57] ABSTRACT

A composition comprising an intimate admixture of
(a) 50 to 98 parts by weight of chlorinated poly(vinyl chloride) and
(b) 50 to 2 parts by weight of an addition tetrapolymer containing the following monomers combined in the polymer structure in the following weight percentages:

|  | Weight Percent |
|---|---|
| Acrylonitrile | 15–35 |
| Methyl methacrylate | 5–45 |
| Indene | 5–45 |
| α-methylstyrene or styrene or a mixture of both | 5–45 |

Where (a) plus (b) total 100 parts by weight, and the total parts by weight of combined indene plus α-methyl styrene plus styrene in the tetrapolymer (b) is 38–70 parts by weight.

2 Claims, No Drawings

CHLORINATED POLY(VINYL CHLORIDE) COMPOSITIONS

This invention relates to chlorinated poly(vinyl chloride) plastic molding compositions or blends having improved working and performance characteristics.

Because CPVC is thermally unstable at processing or working temperatures, it requires thermal stabilizers and lubricants, and its processing temperature window is relatively narrow. See the discussion of CPVC resins in Dalal, G. T., J. of *Vinyl Technology*, March, 1985, Vol. 7, No. 1, pp 36–41 and references cited. The invention concerns blends and/or alloys of chlorinated poly(vinyl chloride), CPVC, with a tetrapolymer containing indene. The blends have improved processability and a higher heat distortion temperatures (HDT) when compared to CPVC itself.

It is an object of the present invention to provide chlorinated poly(vinyl chloride) compositions having improved properties, including a higher heat distortion temperature and a higher melt index, as well as good flexural strength, flexural modulus and tensile strength, among other mechanical properties normally exhibited by CPVC.

Other objects, as well as aspects, features and advantages of the present invention, will become apparent from a study of specification, including the examples and the claims.

The objects enumerated above, and other objects, are realized according to the present invention by providing a composition or blend of a CPVC and certain normally solid tetrapolymers containing indene as one of the monomers.

The tetrapolymers used in the blends of the present invention are normally solid polymers that are the result of addition polymerization of the monomers acrylonitrile, methyl methacrylate, α-methylstyrene and/or styrene and indene. These tetrapolymers usually have a relatively low inherent viscosity. As will be seen, this low viscosity is itself an advantage.

As used herein inherent viscosity is in deciliters per gram of polymer composition.

According to the present invention there is provided a composition comprising an intimate admixture of
(a) 50 to 98 parts by weight of chlorinated poly(vinyl chloride) and
(b) 50 to 2 parts by weight an addition tetrapolymer containing the following monomers combined in the polymer structure in the following weight percentages:

|  | Weight Percent |
|---|---|
| Acrylonitrile | 15–35 |
| Methyl methacrylate | 5–45 |
| Indene | 5–45 |
| α-methylstyrene or styrene or a mixture of both | 5–45 | where (a) plus (b) total 100 parts by weight, and the total parts by weight of combined indene plus α-methyl styrene plus styrene in the tetrapolymer (b) is 38–70 parts by weight, usually 45–60 parts.

The compositions of this invention can include other ingredients, such as impact modifiers, thermal stabilizers, processing aids, fillers, lubricants, pigments, flame retardants, reinforcing fibers, smoke retardants, antioxidants, and the like.

The compositions of this invention can also contain fillers Examples are calcium carbonate, wollastonite, silicates such as talc, acicular calcium silicate, titanium dioxide, potassium titanate, and glass flakes. Amounts of such fillers are up to about 50 parts per 100 parts of the combined CPVC plus the tetrapolymer.

In the foregoing compositions of the invention the more usual composition ranges for the tetrapolymer component are

|  | Weight Percent |
|---|---|
| Acrylonitrile | 20–30 |
| Methyl methacrylate | 15–30 |
| Indene | 10–30 |
| α-methylstyrene plus styrene | 15–40 |

It is an advantage of our tetrapolymers that they are low molecular weight polymers. This automatically results from the influence of the monomer, indene, on the course of the polymerization; thus indene seems to act as an automatic chain tranfer agent. As a result, the polymers used in making the blends of the invention have an inherent viscosity of 0.08 to 0.4, usually 0.01 to 0.36 deciliters per gram. Because of this characteristic of the tetrapolymers, their blends with chlorinated vinyl chloride polymers result in a polymer blend having not only a higher HDT than the CPVC, but also a much higher melt index. The blends of the invention thus not only increase the HDT but also are much more easily mechanically worked because of the high melt index. Our indene tetrapolymer when blended with CPVC, lowers the melt viscosity at processing temperatures, allowing larger parts to be injection molded and making possible higher productivity in extrusion operations. The blend products still maintain the other desirable physical properties of CPVC such as strength.

In the tetrapolymer compositions forming the additive component of our invention, we have found that the indene and the α-methylstyrene and/or the styrene are the main components increasing the HDT, while the polar compounds, acrylonitrile and methacrylate contribute to compatibility with the CPVC, thus helping to maintain other physical mechanical properties. One reason that acrylonitrile alone cannot be used to supply the needed polarity is that too much acrylonitrile also makes the tetrapolymer less compatible with the CPVC. The reason that indene alone is not used as the HDT modifier component is that when the indene content of the additive polymer becomes too high, the polymer tends to become much less compatible with the CPVC, and the use of some α-methylstyrene or styrene alleviates this problem, although the reason is not well understood.

Our invention applies to chlorinated PVC resins that have been chlorinated to add any chlorine to the preformed vinyl chloride polymer. However, the invention finds most use in CPVC having 60–72, more usually 62–70 weight percent combined chlorine. In general, the CPVC used in the blends has an inherent viscosity of at least 0.4, usually at least 0.5.

U.S. Pat. No. 4,304,884 describes an acrylonitrile, styrene or methyl methacrylate, α-methyl styrene terpolymer for improving the processability of CPVC.

However, substantial quantities of an odorous alkyl mercaptan is required to reduce the molecular weight of the terpolymer. This mercaptan gives the final product an undesirable odor. The indene in our tetrapolymer is itself a chain transfer agent producing low molecular weight polymers suitable for blending, leaving the final product free of a mercaptan ordor.

Properties reported in this application were determined by the procedures of the following ASTM designations

| | |
|---|---|
| Heat Distortion Temperature | ASTM D 648 (264 psi unannealed) |
| Tensile Strength | ASTM D 638 |
| Flexural Strength | ASTM D 790 |
| Flexural Modulus | ASTM D 790 |
| Melt Index | ASTM D 1238 |

Also, when inherent viscosity was determined for the tetrapolymers, it was for a solution of 0.2 grams of the polymer in 100 cc of dimethylformamide and was measured at 25° C.

The following examples of the compositions of the invention are merely illustrative and are not to be considered limiting. In the examples CPVC means chlorinated poly(vinyl chloride). The CPVC referred to in the examples unless otherwise stated had a density of 1.563 at 20° C., contained 67 weight percent chlorine and had an inherent viscosity at 25° C. of 0.6 deciliters/gm.

EXAMPLE 1

A tetrapolymer was made by emulsion polymerization according to the following recipe in which amounts are shown in weight parts per 100 total parts of the monomers.

| | |
|---|---|
| Water | 200 |
| Acrylonitrile | 25 |
| Methyl Methacrylate | 20 |
| α-Methylstyrene | 30 |
| Indene | 25 |
| $Na_3PO_4 \cdot 12H_2O$ | 1 |
| Sodium Persulfate | 1.2 |
| Sodium Lauryl Sulfate | 3 |

Sodium lauryl sulfate and the sodium phosphate were dissolved in water and charged to the reactor fitted with a cooling condenser. The reactor contents were placed under a nitrogen atmosphere. The reactor was charged with a monomer mixture consisting of 20 phm acrylonitrile, 15 phm methyl methacrylate, 10 phm α-methylstyrene and 25 phm indene. The contents of the reactor were heated to 75° C. and agitated with a mechanical stirrer.

Polymerization was initiated by adding 0.7 phm $Na_2S_2O_8$. A monomer mixture consisting of 5 phm acrylonitrile, 5 phm methyl methacrylate and 20 phm α-methylstyrene was introduced in measurements starting at 1 hour after the beginning of polymerization. The exact amounts were as following:

| | |
|---|---|
| 1 hour | 20% |
| 2 hours | 20% |
| 3 hours | 20% |
| 4 hours | 20% |
| 5 hours | 20% |

In addition, 0.3 phm and 0.2 phm of additional $Na_2S_2O_8$ was added at 3 hours and 5 hrs, respectively.

After 6 hours the polymerization reached a monomer conversion of 88.7 percent as determined by the solids. Its inherent viscosity was 0.228. Its composition in weight percent was 25 acrylonitrile, 22 methyl methacrylate, 33 α-methylstyrene and 20 indene, as measured by gas chromatography analysis of the residual monomers.

25 parts by weight of the tetrapolymer was mixed with 75 parts OF CPVC, 2.5 parts of the diisooctyl ester of dibutyltin dimercaptoacetic acid, $(C_8H_{17}SCH_2COO)_2Sn(C_4H_9)_2$, thermal stabilizer, 0.2 part of oxidized ethylene homopolymer lubricant, 0.7 part of polyethylene lubricant, 0.8 part of montanic acid ester of a polyfunctional alcohol lubricant and 5 parts of chlorinated polyethylene having 42 weight percent chlorine processing aid in an Oster blender. The mixture was mixed for 5 minutes on a 2 roll plastic mill having a surface temperature of 370° F. The resulting blend was press formed at 400° F. into a plaque. Each resin plaque thus prepared was tested for HDT, melt index, tensile strength and other physical properties. The results were as noted below:

The HDT was 97.0° C., the melt index was 3.01, the tensile strength at yield was 72 MPa, the flexural strength was 97.3 MPa and the flexural modulus was 2,850 MPa.

For comparison purposes tests were made on an identical CPVC compound except that no tetrapolymer was used. The results were that the HDT was 94.5° C., the melt index was 0.41 gm/10 min., the tensile strength was 70.3 MPa, the flexural strength was 98.0 MPa and the flexural modulus was 2656 MPa.

Thus, it will be seen that the melt index and the HDT were greatly improved by the terpolymer, while other properties were nearly unchanged. The higher melt index indicates the improved processiblity.

EXAMPLE 2

A tetrapolymer was made by suspension polymerization according to the following recipe. Amounts are in weight parts per 100 parts of total monomers.

| PHM | Components |
|---|---|
| 150 | $H_2O$ |
| 0.6 | 2,2'-azobis(2,4-dimethylvaleronitrile) |
| 0.2 | Hydroxylethylcellulose (suspending agent) |
| 20 | Acrylonitrile |
| 15 | Methyl Methacrylate |
| 15 | α-Methylstyrene |
| 50 | Indene |

150 parts by weight of distilled water, 0.2 parts of HEC (which has been dissolved in water), 0.2 parts of 2,2'-azobis(2,4-dimethyl-valeronitrile), 20 parts of Acrylonitrile, 5 parts of methyl methacrylate, 5 parts of α-methylstyrene, and 47.5 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 10 parts of methyl methacrylate, 10 parts of α-methylstyrene and 2.5 parts of indene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 40% yield. The composition of the polymer in wt percent was 15 acrylonitrile, 19 methyl methacrylate, 41 α-methylstyrene and 25 indene as determined by $C^{13}$ NMR. The inherent viscosity was 0.132.

When 25 parts of the tetrapolymer are mixed with 75 parts of CPVC, using the recipe of Example 1, similar results are obtained, including an improved HDT and a higher melt index.

EXAMPLE 3

A tetrapolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | Hydroxyethylcellulose (suspending agent) |
| 25 | Acrylonitrile |
| 10 | Methyl Methacrylate |
| 20 | α-Methylstyrene |
| 45 | Indene |

150 parts by weight of distilled water, 0.2 of HEC (which has been dissolved in water), 0.2 parts of 2,2'-azobis(2,4-dimethyl-valeronitrile), 25 parts of Acrylonitrile, 5 parts of methyl methacrylate, 10 parts of α-methylstyrene, and 45 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 5 parts of methyl methacrylate and 10 parts of α-methylstyrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 30.6% yield. The composition of the polymer in wt. percent was 26 acrylonitrile, 14 methyl methacrylate, 38 α-methylstyrene and 21 indene as determined by $C^{13}$ NMR. The inherent viscosity was 0.186.

When 25 parts of the tetrapolymer are mixed with 75 parts of CPVC, using the recipe of Example 1, similar results are obtained, including an improved HDT and a higher melt index.

EXAMPLE 4

A tetrapolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | hydroxyethylcellulose (suspending agent) |
| 30 | Acrylonitrile |
| 15 | Methyl Methacrylate |
| 15 | α-Methylstyrene |
| 40 | Indene |

150 parts by weight of distilled water, 0.2 parts of HEC (which has been dissolved in water), 0.2 parts of 2,2'-azobis(2,4-dimethylvaleronitrile), 30 parts of Acrylonitrile, and 40 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 15 parts of methyl methacrylate and 15 parts of α-methylstyrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 49% yield. The composition of the polymer in wt percent was 26 acrylonitrile, 15 methyl methacrylate, 21 α-methylstyrene and 38 indene as determined by $C^{13}$ NMR. The inherent viscosity was 0.213.

When 25 parts of the tetrapolymer are mixed with 75 parts of CPVC, using the recipe of Example 1, similar results are obtained, including an improved HDT and a higher melt index.

EXAMPLE 5

A tetrapolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | hydroxyethylcellulose (suspending agent) |
| 30 | Acrylonitrile |
| 10 | Methyl Methacrylate |
| 30 | α-Methylstyrene |
| 30 | Indene |

150 parts by weight of distilled water, 0.2 parts of HEC (which has been dissolved in water), 0.2 parts of 2,2'-azobis(2,4-dimethylvaleronitrile), 30 parts of Acrylonitrile and 30 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 10 parts of methyl methacrylate and 30 parts of α-methylstyrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 54% yield. The composition of the polymer in wt percent was 24 acrylonitrile, 6 methyl methacrylate, 42 α-methylstyrene and 28 indene as determined by $C^{13}$ NMR. The inherent viscosity was 0.215.

When 25 parts of the tetrapolymer are mixed with 75 parts of CPVC, using the recipe of Example 1, similar results are obtained, including an improved HDT and a higher melt index.

EXAMPLE 6

A tetrapolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | hydroxyethylcellulose (suspending agent) |
| 30 | Acrylonitrile |
| 15 | Methyl Methacrylate |
| 15 | α-Methylstyrene |
| 40 | Indene |

150 parts by weight of distilled water, 0.2 parts of HEC (which has been dissolved in water), 0.2 parts of 2,2'-azobis(2,4-dimethylvaleronitrile), 30 parts of Acrylonitrile and 40 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 15 parts of methyl methacrylate and 15 parts of α-methylstyrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 51% yield. The composition of the polymer in weight percent was 25 acrylonitrile, 16 methyl methacrylate, 28 α-methylstyrene and 31 indene as determined by $C^{13}$ NMR. The inherent viscosity was 0.210.

When 25 parts of the tetrapolymer are mixed with 75 parts of CPVC, using the recipe of Example 1, similar results are obtained, including an improved HDT and a higher melt index.

EXAMPLE 7

A tetrapolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | hydroxyethylcellulose (suspending agent) |
| 25 | Acrylonitrile |
| 20 | Methyl Methacrylate |
| 10 | a-Methylstyrene |
| 45 | Indene |

150 parts by weight of distilled water, 0.2 parts of HEC (which has been dissolved in water), 0.2 parts of 2,2'-azobis(2,4-dimethylvaleronitrile), 25 parts of Acrylonitrile and 40 parts of indene were charged into a reactor provided with a stirrer. The reactor was purged with nitrogen, and was kept under nitrogen pressure. The temperature of the reactor was held for 5 minutes at 70° C. with stirring; then a monomer mixture comprising 0.4 parts of 2,2'-azobis(2,4-dimethylvaleronitrile), 20 parts of methyl methacrylate, 10 parts of α-methylstyrene and 5 parts of indene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 40% yield. The composition of the polymer in weight percent was 22 acrylonitrile, 23 methyl methacrylate, 20 α-methylstyrene and 36 indene as determined by $C^{13}$ NMR. The inherent viscosity was 0.166.

When 25 parts of the tetrapolymer are mixed with 75 parts of CPVC, using the recipe of Example 1, similar results are obtained, including an improved HDT and a higher melt index.

EXAMPLE 8

A tetrapolymer was made by emulsion polymerization according to the following recipe. Amounts are in weight parts per 100 parts of total monomers.

| PHM | Components |
| --- | --- |
| 200 | $H_2O$ |
| 2.5 | Sodium lauryl sulfate |
| 1.0 | $Na_2S_2O_8$ |
| 1.0 | $Na_3PO_4.12H_2O$ |
| 25 | Acrylonitrile |
| 20 | Methyl Methacrylate |
| 30 | α-Methylstyrene |
| 25 | Indene |

200 parts by weight of distilled water, 2.5 parts of Sodium lauryl sulfate, 1.0 part of $Na_3PO_4$ 12 $H_2O$, 18 parts of acrylonitrile, 12 parts of methyl methacrylate, 8 parts of α-methylstyrene, 25 parts of indene and 0.7 parts of $Na_2S_2O_8$ were charged into a reactor provided with a stirrer. The reactor was purged with nitrogen, and was kept under nitrogen pressure. The temperature of the reactor was held at 75° C. for 1 hour with stirring; then a monomer mixture comprising 7 parts of acrylonitrile, 8 parts of methyl methacrylate and 22 parts of α-methylstyrene was incrementally added in portions into the reactor once every hour over a period of 5 hours through a syringe pump. At the third hour an additional 0.3 parts of $Na_2S_2O_8$ was added into the reactor for maintaining the reaction rate. The resulting mixture was allowed to react for 1.5 more hours more after the incremental additions. After completion of the reaction, the polymer was recovered through freeze coagulation of the latex. The polymer was filtered, and was then stirred with excess methanol overnight to remove residual monomers. The polymer was filtered again and dried in a vacuum oven for 24 hours at 60° C. A powdery tetrapolymer was obtain in an 88 percent yield. Its composition, as determined by gas chromatograph analysis of residual monomers and the yield, was 25 acrylonitrile, 21 methyl methacrylate, 33 α-methylstyrene and 21 indene, all in weight percent. The inherent viscosity was 0.230.

When 25 parts of the tetrapolymer are mixed with 75 parts of CPVC, using the recipe of Example 1, similar results are obtained, including an improved HDT and a higher melt index.

EXAMPLE 9

A tetrapolymer was made by suspension polymerization according to the following recipe. Amounts are in weight parts per 100 parts of total monomers.

| PHM | Components |
| --- | --- |
| 150 | H$_2$O |
| 0.6 | 2,2'-azobis(2,4-dimethylvaleronitrile) |
| 0.2 | hydroxyethylcellulose (suspending agent) |
| 25 | Acrylonitrile |
| 20 | Methyl Methacrylate |
| 10 | Styrene |
| 45 | Indene |

150 parts by weight of distilled water, 0.2 parts of HEC (which has been dissolved in water), 0.2 parts of 2,2'-azobis(2,4-dimethylvaleronitrile), 25 parts of Acrylonitrile, 10 parts of methyl methacrylate and 45 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 10 parts of methyl methacrylate and 10 parts of styrene is added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered and dried in a vacuum oven for 24 hrs at 60° C. A powdery tetrapolymer was obtained in a 43 percent yield. The composition of the polymer in weight percent was 25 acrylonitrile, 28 methyl methacrylate, 7 styrene and 40 indene as determined by C$^{13}$ NMR. The inherent viscosity was 0.152.

When 25 parts of the tetrapolymer are mixed with 75 parts of CPVC, using the recipe of Example 1, similar results are obtained, including an improved HDT and a higher melt index.

EXAMPLE 10

25 parts by weight of the tetrapolymer of Example 1 was mixed with 75 parts of CPVC, 2.5 parts of the diisooctyl ester of dibutyltin dimercaptoacetic acid, (C$_8$H$_{17}$SCH$_2$COO)$_2$Sn(C$_4$H$_9$)$_2$, thermal stabilizer, 0.2 part of oxidized ethylene homopolymer lubricant, 0.3 part of polyethylene lubricant, and 0.3 part of montanic acid ester of a polyfunctional alcohol lubricant in an Oster blender. The mixture was mixed for 5 minutes on a 2 roll plastic mill having a surface temperature of 370° F. The resulting blend was press formed at 400° F. into a plaque. Each resin plaque thus prepared was tested for HDT, melt index, tensile strength and other physical properties. The results were as noted below:

The HDT was 104° C., the melt index was 2.03, the tensile strength at yield was 63.6 MPa, the flexural strength was 69 MPa, and the flexural modulus was 2512 MPa.

For comparison purposes tests were made on an identical CPVC compound except that no tetrapolymer was used. The results were that the HDT was 95.5° C., the melt index was 0.307, the tensile strength was 109 MPa, the flexural strength was 109 MPa, and the flexural modulus was 2760 MPa.

EXAMPLE 11

A tetrapolymer was made by suspension polymerization according to the following recipe. Amounts are in weight parts per 100 parts of total monomers.

| PHM | Components |
| --- | --- |
| 150 | H$_2$O |
| 0.6 | 2,2'-azobis(2,4-dimethylvaleronitrile) |
| 0.2 | hydroxyethylcellulose (suspending agent) |
| 25 | Acrylonitrile |
| 10 | Methyl Methacrylate |
| 20 | Styrene |
| 45 | Indene |

150 parts by weight of distilled water, 0.2 parts of HEC (which has been dissolved in water), 0.2 parts of 2,2'-azobis(2,4-dimethylvaleronitrile), 25 parts of Acrylonitrile, 5 parts of methyl methacrylate, 2 of styrene and 45 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 5 parts of methyl methacrylate and 18 parts of styrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered and dried in a vacuum oven for 24 hrs at 60° C. A powdery tetrapolymer was obtained in a 50 percent yield. The composition of the polymer in weight percent was 30 acrylonitrile, 13 methyl methacrylate, 22 styrene and 35 indene as determined by C$^{13}$ NMR. The inherent viscosity was 0.175.

When 25 parts of the tetrapolymer are mixed with 75 parts of CPVC, using the recipe of Example 10, similar results are obtained, including an improved HDT and a higher melt index.

EXAMPLE 12

A tetrapolymer was made by suspension polymerization according to the following recipe. Amounts are in weight parts per 100 parts of total monomers.

| PHM | Components |
| --- | --- |
| 150 | H$_2$O |
| 0.6 | 2,2'-azobis(2,4-dimethylvaleronitrile) |
| 0.2 | hydroxyethylcellulose (suspending agent) |
| 20 | Acrylonitrile |
| 20 | Methyl Methacrylate |
| 20 | Styrene |
| 40 | Indene |

150 parts by weight of distilled water, 0.2 parts of HEC (which has been dissolved in water), 0.2 parts of 2,2'-azobis(2,4-dimethylvaleronitrile), 20 parts of Acrylonitrile and 40 parts of indene were charged into a reactor provided with a stirrer. The reactor was purged with nitrogen, and was kept under nitrogen pressure. The temperature of the reactor was held for 5 minutes at 65° C. with stirring. Then 20 parts of MMA was added at a constant rate with a syringe pump over a period of 8.5 hours and using another syringe pump 20 parts of styrene was added at a constant rate over a period of 11 hours. The resulting mixture was further allowed to react for 6 more hours. After completion of the reaction, the polymer obtained was dissolved into acetone, and reprecipitated in excess methanol. The polymer was filtered and dried in a vacuum oven for 24 hrs at 60° C. A powdery tetrapolymer was obtained in a 50 percent yield. The composition of the polymer in weight percent was 22 acrylonitrile, 24 methyl methacrylate, 23 styrene and 31 indene as determined by $C^{13}$ NMR. The inherent viscosity was 0.194.

When 25 parts of the tetrapolymer are mixed with 75 parts of CPVC, using the recipe of Example 10, similar results are obtained, including an improved HDT and a higher melt index.

EXAMPLE 13

A tetrapolymer was made by suspension polymerization according to the following recipe. Amounts are in weight parts per 100 parts of total monomers.

| PHM | Components |
| --- | --- |
| 150 | H$_2$O |
| 0.6 | 2,2'-azobis(2,4-dimethylvaleronitrile) |
| 0.2 | hydroxyethylcellulose (suspending agent) |
| 20 | Acrylonitrile |
| 10 | Methyl Methacrylate |
| 30 | Styrene |
| 40 | Indene |

150 parts by weight of distilled water, 0.2 parts of HEC (which has been dissolved in water), 0.2 parts of 2,2,'-azobis( 2,4-dimethylvaleronitrile), 20 parts of Acrylonitrile and 40 parts of indene were charged into a reactor provided with a stirrer. The reactor was purged with nitrogen, and was kept under nitrogen pressure. The temperature of the reactor was held for 5 minutes at 65° C. with stirring. Then a monomer mixture comprising 0.4 parts of 2,2'-azobis(2,4-dimethylvaleronitrile), 10 parts of methyl methacrylate, and 30 parts of styrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered and dried in a vacuum oven for 24 hrs at 60° C. A powdery tetrapolymer was obtained in a 51 percent yield. The composition of the polymer in weight percent was 25 acrylonitrile, 15 methyl methacrylate, 35 styrene, and 25 indene, as determined by $C^{13}$ NMR. The inherent viscosity was 0.184.

When 25 parts of the tetrapolymer are mixed with 75 parts of CPVC, using the recipe of Example 10, similar results are obtained, including an improved HDT and a higher melt index.

EXAMPLE 14

A tetrapolymer was made by suspension polymerization according to the following recipe. Amounts are in weight parts per 100 parts of total monomers.

| PHM | Components |
| --- | --- |
| 150 | H$_2$O |
| 0.6 | 2,2'-azobis(2,4-dimethylvaleronitrile) |
| 0.2 | hydroxyethylcellulose (suspending agent) |
| 20 | Acrylonitrile |
| 30 | Methyl Methacrylate |
| 20 | Styrene |
| 30 | Indene |

150 parts by weight of distilled water, 0.2 parts of HEC (which has been dissolved in water), 0.2 parts of 2,2'-azobis(2,4-dimethylvaleronitrile), 20 parts of Acrylonitrile, 5 parts of of methyl methacrylate and 30 parts of indene were charged into a reactor provided with a stirrer. The reactor was purged with nitrogen, and was kept under nitrogen pressure. The temperature of the reactor was held for 5 minutes at 65° C. with stirring. Then a monomer mixture comprising 0.4 parts of 2,2'-azobis(2,4-dimethylvaleronitrile), 25 parts of methyl methacrylate, and 20 parts of styrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered and dried in a vacuum oven for 24 hrs at 60° C. A powdery tetrapolymer was obtained in a 54 percent yield. The composition of the polymer in weight percent was 20 acrylonitrile, 29 methyl methacrylate, 14 styrene and 37 indene as determined by $C^{13}$ NMR. The inherent viscosity was 0.226.

When 25 parts of the tetrapolymer are mixed with 75 parts of CPVC, using the recipe of Example 10, similar results are obtained, including an improved HDT and a higher melt index.

EXAMPLE 15

A tetrapolymer was made by suspension polymerization according to the following recipe. Amounts are in weight parts per 100 parts of total monomers.

| PHM | Components |
| --- | --- |
| 200 | H$_2$O |
| 0.2 | hydroxyethylcellulose (suspending agent) |
| 20 | Acrylonitrile |
| 30 | Methyl Methacrylate |
| 10 | Styrene |
| 40 | Indene |
| 0.6 | Catalyst: 2,5-dimethyl-2,5-bis(benzoylperoxy)hexane |

100 parts by weight of distilled water, 0.2 parts of HEC (which has been dissolved in 100 parts of water), 0.4 parts of the catalyst, 20 parts of Acrylonitrile, 7.5 parts of of methyl methacrylate and 40 parts of indene were charged into a reactor provided with a stirrer. The reactor was purged with nitrogen, and was kept under nitrogen pressure. The temperature of the reactor was held for 0.5 hours at 100° C. with stirring. Then a monomer mixture comprising 0.2 parts of the catalyst, 22.5 parts of methyl methacrylate, and 10 parts of styrene was added continually into the reactor over a period of 10 hours.

The polymer was allowed to settle and the water decanted. Thereafter the polymer was washed with methanol, filtered and dried. Conversion was 69 percent to the tetrapolymer having a composition in weight percent of 21 acrylonitrile, 40 methyl methacrylate, 9 styrene and 29 indene as determined by $C^{13}$ NMR. Its inherent viscosity was 0.154.

When 25 parts of the tetrapolymer are mixed with 75 parts of CPVC, using the recipe of Example 10, similar results are obtained, including an improved HDT and a higher melt index.

EXAMPLE 16

A tetrapolymer was made by emulsion polymerization according to the following recipe in which amounts are shown in weight parts per 100 total parts of the monomers.

|  | Total Charge PHM | Initial Charge PHM | Metering Syringe |
| --- | --- | --- | --- |
| Water | 297 | 297 |  |
| Dioctylsulfosuccinate (75% soln. in ethanol) | 2.7 | 2.7 |  |
| Acrylonitrile | 20 | 12 | 8 |
| Methyl Methacrylate | 30 | 18 | 12 |
| α-methylstyrene | 20 | 12 | 8 |
| Indene | 30 | 18 | 12 |
| Sodium persulfate (10%) | 10 | 4 |  |

A 1-liter, 3-necked flask was fitted with a Teflon-bladed stirrer, a thermometer, a reflux condenser, a septum and a nitrogen inlet at the top of the condenser. The nitrogen line was fitted with a T and a water bubbler to maintain a constant, slight positive nitrogen pressure in the reactor. The reactor (3-necked flask) was suspended in a glycerol heating bath maintained at a constant temperature. A syringe metering pump was used to meter in part of the monomer during the polymerization.

The flask was charged with the water, emulsifier, and monomers and bubbled with a strong nitrogen stream to remove oxygen. The neck opening was capped with a rubber septum and the flask was heated. The flask contents were maintained under a nitrogen atmosphere and stirred at about 200 rpm. When the flask contents reached 65° C., 4 ml of a 10 percent solution of sodium persulfate was injected into the reactor. The reaction temperature remained constant at 65° C. throughout the reaction time.

After the reaction had progressed for 1 hour, the metering pump was turned on. The metering pump contained the quantity of monomer shown in the recipe. The monomer was metered into the reactor during a 13 hour period at a constant rate.

During the polymerization, the other 6 ml of catalyst (10 percent $Na_2S_2O_8$) was injected into the reactor in two equal portions; 3 ml at 4.25 hours and 3 ml at 7.75 hours.

At the end of the monomer metering period, the temperature and stirring was maintained for 8.75 additional hours. Then the polymer latex was allowed to cool. A total solids determination on the latex indicated a conversion of 80.4 percent.

$C^{13}$ NMR indicated a polymer composition of 21 percent acrylonitrile, 40 percent methyl methacrylate, 17 percent α-methylstyrene and 22 percent indene, all in weight percent.

The cooled latex was filtered through cheesecloth, collecting 3.5 parts by weight (when dried) of a finely-divided prefloc (powder when dried). After coagulation the polymer was later collected on a filter by vacuum filtration. The polymer particles were flushed with water then with methanol to remove water and monomer from the particle surfaces. The polymer particles were then stirred in some methanol and again filtered. The powder was then allowed to stand in methanol overnight to further soak out monomer. After again filtering and air drying, the polymer was dried overnight in a vacuum oven at 80° C. The product had the appearance of glistening, white sugary-type powder.

When 25 parts of the tetrapolymer are mixed with 75 parts of CPVC, using the recipe of Example 1, similar results are obtained, including an improved HDT and a higher melt index.

EXAMPLE 17

A tetrapolymer was made by emulsion polymerization according to the following recipe in a 10 gallon, stainless steel reactor equipped with a heating jacket, and a stirrer.

|  | PHM Dry | PHM Wet | Total Charge (kg) | Initial Charge (kg) | Monomers Added (kg) |
| --- | --- | --- | --- | --- | --- |
| Water | — | 191 | 19.1 | 19.1 | — |
| Sodium Lauryl Sulfate | 3.0 | 3.0 | .25 | .25 | — |
| $Na_3PO_4\ 12H_2O$ | 1.0 | 1.0 | .10 | .10 | — |
| Acrylonitrile | 25 | 25 | 2.5 | 2.0 | .5 |
| Methyl Methacrylate | 20 | 20 | 2.0 | 1.5 | .5 |
| α-Methyl Styrene | 30 | 30 | 3.0 | 1.0 | 2.0 |
| Indene | 25 | 25 | 2.5 | 2.5 | — |
| Sodium Persulfate (10%) | 1.2 | 12 | 1.2 | .6 | — |

The reactor was charged with the ingredients listed under initial charge in the recipe above, except for the persulfate catalyst. The reactor was buttoned down and the oxygen removed by alternately applying a vacuum and nitrogen pressure three times. The reactor was then pressure tested with nitrogen at 50 psi.

The stirrer was set at 150 ft/min tip speed, and heat applied. At 75° C., 500 g of 10 percent solution of the persulfate catalyst was added. Total solids were taken at intervals to follow the conversion; After the first hour 5 incremental additions of the added monomers were made each hour.

During the polymerization, the other 600 g of catalyst (10 percent $Na_2S_2O_8$) was injected into the reactor in two equal portions; 300 g at 2.5 hours and 300 g at 4.5 hours.

At the end of the monomer addition period, the temperature and stirring was maintained for 1 additional hour. Then the polymer latex was allowed to cool.

A gas chromatographic analysis of the unreacted monomers indicated a conversion of 88 percent, a polymer composition of 25 percent acrylonitrile, 21 percent methyl methacrylate, 33 percent α-methylstyrene and 21 percent indene.

The cooled latex was filtered through cheesecloth. The cooled latex was freeze coagulated, filtered and the polymer collected on a filter by vacuum filtration. The polymer particles were flushed with water then with methanol to remove water and monomer from the particle surfaces. The polymer particles were then stirred in some methanol and again filtered. The powder was then allowed to stand in methanol overnight to further soak out monomer. After again filtering and air drying, the polymer was dried overnight in a vacuum oven at 80° C. The product had the appearance of glistening, white sugary-type powder.

The inherent viscosity of the tetrapolymer was 0.256.

When 25 parts of the tetrapolymer are mixed with 75 parts of CPVC, using the recipe of Example 10, similar results are obtained, including an improved HDT and a higher melt index.

EXAMPLE 18

25 parts by weight of the tetrapolymer of Example 1 was mixed with 75 parts of CPVC, 3.0 parts of the diisooctyl ester of dibutyltin dimercaptoacetic acid, $(C_8H_{17}SCH_2COO)_2Sn(C_4H_9)_2$, thermal stabilizer and 2.0 parts of oxidized ethylene homopolymer lubricant in an Oster blender. The mixture was mixed for 5 minutes on a 2 roll plastic mill having a surface temperature of 370° F. The resulting blend was press formed at 400° F. into a plaque. Each resin plaque thus prepared was tested for HDT, melt index, tensile strength and other physical properties. The results were as noted below:

The HDT was 99.5° C., the melt index was 2.11, the tensile strength at yield was 64 MPa, the flexural strength was 84.9 MPa, and the flexural modulus was 2691 MPa.

For comparison purposes tests were made on an identical CPVC compound except that no tetrapolymer was used. The results were that the HDT was 97.5° C., the melt index was 0.32, the tensile strength was 74.5 MPa, the flexural strength was 102.8 MPa, and the flexural modulus was 2829 MPa.

EXAMPLE 19

A tetrapolymer was made by emulsion polymerization according to the following recipe in which amounts are shown in parts by weight.

| | PARTS BY WEIGHT | | | |
|---|---|---|---|---|
| | Dry | Wet | Total Charge | Initial Charge | Metering Syringe |
| Water | — | 191 | 382 | 382 | — |
| Sodium Lauryl Sulfate | 2.5 | 2.5 | 5.0 | 5 | — |
| Na$_3$PO$_4$.12H$_2$O | 1.0 | 1.0 | 2.0 | 2 | — |
| Acrylonitrile | 25 | 25 | 50 | 36 | 14 |
| Methyl Methacrylate | 20 | 20 | 40 | 24 | 16 |
| α-Methyl Styrene | 30 | 30 | 60 | 16 | 44 |
| Indene | 25 | 25 | 50 | 50 | — |
| Sodium Persulfate (10%) | 1.0 | 10 | 20 | 10 | — |

A 1-liter, 3-necked flask was fitted with a Teflon-bladed stirrer, a thermometer, a reflux condenser, a septum and a nitrogen inlet at the top of the condenser. The nitrogen line was fitted with a T and a water bubbler to maintain a constant, slight positive nitrogen pressure in the reactor. The reactor (3-necked flask) was suspended in a glycerol heating bath maintained at a constant temperature. A syringe metering pump was used to meter in part of the monomer during the polymerization.

The flask was charged with the water, emulsifier, phosphate and monomers and bubbled with a strong nitrogen stream to remove oxygen. The neck opening was capped with a rubber septum and the flask was heated. The flask contents were maintained under a nitrogen atmosphere and stirred at about 200 rpm. When the flask contents reached 75° C., 10 ml of a 10 percent solution of sodium persulfate was injected into the reactor. The reaction temperature remained constant at 75° C. throughout the reaction time.

After the reaction had progressed for 0.5 hour, the metering pump was turned on. The metering pump contained the quantity of monomer shown in the recipe. The monomer was metered into the reactor during a 5 hour period at a constant rate.

After 2.5 hours polymerization, 5 ml of catalyst (10 percent Na$_2$S$_2$O$_8$) was injected into the reactor, and 5 ml after 4.5 hours.

At the end of the monomer metering period, the temperature and stirring was maintained for 1.0 additional hour. Then the polymer latex was allowed to cool. A total solids determination on the latex indicated a conversion of 87 percent.

A gas chromatographic analysis of the unreacted monomers indicated a conversion of 89 percent, a polymer composition of 25 percent acrylonitrile, 21 percent methyl methacrylate, 33 percent α-methylstyrene and 21 percent indene.

The cooled latex was filtered through cheesecloth, collecting 3.5 parts by weight (when dried) of a finely-divided prefloc (powder when dried). The polymer latex was freeze coagulated and later collected on a filter by vacuum filtration. The polymer particles were flushed with water then with methanol to remove water and monomer from the particle surfaces. The polymer particles were then stirred in some methanol and again filtered. The powder was then allowed to stand in methanol overnight to further soak out monomer. After again filtering and air drying, the polymer was dried overnight in a vacuum oven at 80° C. The product had the appearance of glistening, white sugary-type powder. The inherent viscosity of the tetrapolymer was 0.227.

When 25 parts of the tetrapolymer are mixed with 75 parts of CPVC, using the recipe of Example 18, similar results are obtained, including an improved HDT and a higher melt index.

EXAMPLE 20

A tetrapolymer was made by emulsion polymerization according to the following recipe in which amounts are shown in weight parts per 100 total parts of the monomers.

| Water | 200 |
|---|---|
| Triton 770 | 0.33 |
| Acrylonitrile[a] | 25 |
| Methyl Methacrylate | 20 |
| α-Methylstyrene | 30 |
| Indene | 25 |
| Na$_3$PO$_4$.12H$_2$O | 1 |
| Sodium Persulfate | 1.3 |
| Sodium Lauryl Sulfate | 3 |

[a]sodium alkylaryl ether sulfate 30 percent, 2-propanol 23 percent and water 47 percent Sodium lauryl sulfate, the sodium phosphate and triton 770 were dissolved in water and charged to the reactor fitted with a cooling condenser. The reactor contents were placed under a nitrogen atmosphere.

The reactor was charged with a monomer mixture consisting of 20 phm acrylonitrile, 15 phm methacrylate, 10 phm α-methylstyrene and 25 phm indene. The contents of the reactor were heated to 75° C. and agitated with a mechanical stirrer.

Polymerization was initiated by adding 0.8 phm Na$_2$S$_2$O$_8$. A monomer mixture consisting of 5 phm acrylonitrile, 5 phm methyl methacrylate and 20 phm α-methylstyrene was introduced in measurements starting at 1 hour after the beginning of polymerization. The exact amounts were as following:

| 1 hour | 13.3% |
|---|---|

| | |
|---|---|
| 2 hours | 13.3% |
| 2.25 hours | 13.3% |
| 3 hours | 20% |
| 4 hours | 20% |
| 5 hours | 20% |

In addition, 0.3 phm and 0.2 phm of additional Na$_2$S$_2$O$_8$ were added at 3 hours and 5 hours, respectively.

After 7 hours the polymerization reached a monomer conversion of 87 percent as determined by the solids measurements. Its inherent viscosity was 0.206. Its composition in weight percent was 23 acrylonitrile, 29 methyl methacrylate, 32 α-methylstyrene and 16 indene, as measured by C$^{13}$ NMR.

When 25 parts of the tetrapolymer are mixed with 75 parts of CPVC, using the recipe of Example 18, similar results are obtained, including an improved HDT and a higher melt index.

EXAMPLE 21

A tetrapolymer was made by emulsion polymerization according to the following recipe in which amounts are shown in weight parts per 100 total parts of the monomers.

| | PHM |
|---|---|
| Water | 200 |
| Acrylonitrile | 25 |
| Methyl Methacrylate | 20 |
| α-Methylstyrene | 30 |
| Indene | 25 |
| Na$_3$PO$_4$.12H$_2$O | 1 |
| Sodium Persulfate | 1.0 |
| Sodium Lauryl Sulfate | 3 |

Sodium lauryl sulfate and the sodium phosphate were dissolved in water and charged to the reactor fitted with a cooling condenser. The reactor contents were placed under a nitrogen atmosphere. The reactor was charged with a monomer mixture consisting of 17 phm acrylonitrile, 11 phm methyl methacrylate, 10 phm α-methylstyrene and 25 phm indene. The contents of the reactor were heated to 75° C. and agitated with a mechanical stirrer.

Polymerization was initiated by adding 0.7 phm Na$_2$S$_2$O$_8$. A monomer mixture consisting of 8 phm acrylonitrile, 9 phm methyl methacrylate and 20 phm α-methylstyrene was introduced in measurements starting at 1 hour after the beginning of polymerization. The exact amounts were as following:

| | |
|---|---|
| 1 hour | 20% |
| 2 hours | 20% |
| 3 hours | 20% |
| 4 hours | 20% |
| 5 hours | 20% |

In addition, 0.3 phm and 0.2 phm of additional Na$_2$S$_2$O$_8$ was added at 3 hours and 5 hours, respectively.

After 7 hours the polymerization reached a monomer conversion of 88 percent as determined by the solids measurements. Its inherent viscosity was 0.224. Its composition in weight percent was 25 acrylonitrile, 21 methyl methacrylate, 36 α-methylstyrene and 18 indene, as measured by gas chromatography analysis of the residual monomers.

EXAMPLE 22

A tetrapolymer was made by suspension polymerization according to the following recipe. Amounts are in weight parts per 100 parts of total monomers.

| PHM | Components |
|---|---|
| 150 | H$_2$O |
| 0.6 | 2,2'-azobis(2,4-dimethylvaleronitrile) |
| 0.2 | hydroxyethylcellulose (suspending agent) |
| 20 | Acrylonitrile |
| 20 | Methyl Methacrylate |
| 20 | α-Methylstyrene |
| 40 | Indene |

150 parts by weight of distilled water, 0.2 parts of HEC (which has been dissolved in water), 0.2 parts of 2,2'-azobis(2,4-dimethyl-valeronitrile), 20 parts of Acrylonitrile, 10 parts of methyl methacrylate, 10 parts of α-methylstyrene, and 40 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethyl-valeronitrile), 10 parts of methyl methacrylate and 10 parts of α-methylstyrene was added continually into the reactor over a period of 10 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained. The composition of the polymer in wt percent was 23 acrylonitrile, 20 methyl methacrylate, 34 α-methylstyrene and 22 indene as determined by C$^{13}$ NMR. The inherent viscosity was 0.172.

When 25 parts of the tetrapolymer are mixed with 75 parts of CPVC, using the recipe of Example 18, similar results are obtained, including an improved HDT and a higher melt index.

EXAMPLE 23

A tetrapolymer was made by suspension polymerization according to the following recipe. Amounts are in weight parts per 100 parts of total monomers.

| PHM | Components |
|---|---|
| 150 | H$_2$O |
| 0.6 | 2,2'-azobis(2,4-dimethylvaleronitrile) |
| 0.2 | hydroxyethylcellulose (suspending agent) |
| 20 | Acrylonitrile |
| 30 | Methyl Methacrylate |
| 10 | Styrene |
| 40 | Indene |

150 parts by weight of distilled water, 0.2 parts of HEC (which has been dissolved in water), 0.2 parts of 2,2'-azobis(2,4-dimethyl-valeronitrile), 20 parts of Acrylonitrile, 15 parts of methyl methacrylate, 2 parts of α-methylstyrene, and 40 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethyl-valeronitrile), 15 parts of methyl methacrylate and 8 parts of α-methylstyrene was added continually into the reactor over a period of 8 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained. The composition of the polymer in wt percent was 19 acrylonitrile, 41 methyl methacrylate, 16 styrene and 23 indene as determined by $C^{13}$ NMR. The inherent viscosity was 0.215.

EXAMPLE 24

A tetrapolymer was made by suspension polymerization according to the following recipe. Amounts are in weight parts per 100 parts of total monomers.

| PHM | Components |
|---|---|
| 150 | H$_2$O |
| 0.6 | 2,2'-azobis(2,4-dimethylvaleronitrile) |
| 0.2 | hydroxyethylcellulose (suspending agent) |
| 20 | Acrylonitrile |
| 30 | Methyl Methacrylate |
| 10 | Styrene |
| 40 | Indene |

150 parts by weight of distilled water, 0.2 parts of HEC (which has been dissolved in water), 0.2 parts of 2,2'-azobis(2,4-dimethyl-valeronitrile), 20 parts of Acrylonitrile, 15 parts of methyl methacrylate, 2 parts of styrene, and 40 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 15 parts of methyl methacrylate and 8 parts of styrene was added continually into the reactor over a period of 8 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained. The composition of the polymer in wt percent was 19 acrylonitrile, 41 methyl methacrylate, 16 styrene and 23 indene as determined by $C^{13}$ NMR. The inherent viscosity was 0.215.

When 25 parts of the tetrapolymer are mixed with 75 parts of CPVC, using the recipe of Example 18, similar results are obtained, including an improved HDT and a higher melt index.

EXAMPLE 25

10 parts by weight of the tetrapolymer of Example 1 was mixed with 90 parts of CPVC, 3.0 parts of the diisooctyl ester of dibutyltin dimercaptoacetic acid, $(C_8H_{17}SCH_2COO)_2Sn(C_4H_9)_2$, thermal stabilizer, 2.0 parts of oxidized ethylene homopolymer lubricant, 0.3 part of polyethylene lubricant in an Oster blender. The mixture was mixed for 5 minutes on a 2 roll plastic mill having a surface temperature of 370° F. The resulting blend was press formed at 400° F. into a sheet, then a plaque. Each resin plaque thus prepared was tested for HDT, melt index, tensile strength and other physical properties. The results were as noted below:

The HDT was 98° C., the melt index was 0.72, the tensile strength at yield was 78.0 MPa, the flexural strength was 107.6 MPa, and the flexural modulus was 2,829 MPa.

For comparison purposes tests were made on an identical CPVC compound except 10 parts by weight of Blendex ® 586 heat distortion modifier sold by Borg-Warner replaced the tetrapolymer. The results were that the HDT was 97.5° C., the melt index was 0.53, the tensile strength at yield was 76.2 MPa, the flexural strength was 106.3 MPa, and the flexural modulus was 2691 MPa.

BRABENDER PLASTIGRAPH TESTS

Other portions of the compositions of Examples 18 and 23 were mixed in a Brabender Plastigraph at 410° C. for a time sufficient to determine the minimum torque developed during plasticization, as well as the time for the onset of decomposition. Results are shown in the following table.

| Sample | Minimum Torque, Meter-grams | Decomposition, Minutes |
|---|---|---|
| No Blending Agent (Ex 18) | 1846 | 17.6 |
| 25% Tetrapolymer (Ex 18) | 1225 | none after 25 minutes |
| 10% Tetrapolymer (Ex 23) | 1661 | 19 |
| 10% Blendex 586 (Ex 23) | 1864 | 14.2 |

These data show that the processability of the compounds containing the tetrapolymer was far superior to the unblended CPVC compound and to the CVPC compound containing Blendex 586.

As will be evident to those skilled in the art, various modifications of this invention can be made or followed in the light of the foregoing disclosure and discussion without departing from the spirit and scope of the disclosure or from the scope of the claims.

We claim:
1. A composition comprising an intimate admixture of
   (a) 50 to 98 parts by weight of chlorinated poly (vinyl chloride) and
   (b) 50 to 2 parts by weight of an addition tetrapolymer containing the following monomers combined in the polymer structure in the following weight percentages:

|  | Weight Percent |
|---|---|
| Acrylonitrile | 15–35 |
| Methyl methacrylate | 5–45 |
| Indene | 5–45 |
| α-methylstyrene or styrene or a mixture of both | 5–45 | where (a) plus (b) total 100 parts by weight, and the total parts by weight of combined indene plus α-methyl styrene plus styrene in the tetrapolymer (b) is 38–70 parts by weight.

2. A composition comprising an intimate admixture of
   (a) 50 to 98 parts by weight of chlorinated poly (vinyl chloride) and
   (b) 50 to 2 parts by weight of an addition tetrapolymer containing the following monomers combined in the polymer structure in the following weight percentages:

| | Weight Percent |
|---|---|
| Acrylonitrile | 20-30 |
| Methyl methacrylate | 15-30 |
| Indene | 10-30 |

| | Weight Percent |
|---|---|
| α-methylstyrene or styrene or a mixture of both | 15-40 | where (a) plus (b) total 100 parts by weight, and the total parts by weight of combined indene plus α-methyl styrene plus styrene in the tetrapolymer (b) is 45-60 parts by weight.

* * * * *